April 28, 1931.  G. H. PITTMAN  1,802,831
PHONOGRAPH
Filed July 15, 1927   7 Sheets-Sheet 1

INVENTOR.
G. H. Pittman
BY Williams & Moore
ATTORNEYS.

April 28, 1931.  G. H. PITTMAN  1,802,831
PHONOGRAPH
Filed July 15, 1927  7 Sheets-Sheet 2

INVENTOR.
G. H. Pittman
BY Williams & Moore
ATTORNEYS.

April 28, 1931. G. H. PITTMAN 1,802,831
PHONOGRAPH
Filed July 15, 1927 7 Sheets-Sheet 4

INVENTOR.
G. H. Pittman
BY
Williams & Morse
ATTORNEYS.

April 28, 1931.  G. H. PITTMAN  1,802,831
PHONOGRAPH
Filed July 15, 1927    7 Sheets-Sheet 5

INVENTOR.
G. H. Pittman
BY Williams & Morse
ATTORNEYS.

April 28, 1931.  G. H. PITTMAN  1,802,831
PHONOGRAPH
Filed July 15, 1927   7 Sheets-Sheet 6

INVENTOR.
G. H. Pittman
BY
Williams & Morse
ATTORNEYS.

April 28, 1931. G. H. PITTMAN 1,802,831
PHONOGRAPH
Filed July 15, 1927 7 Sheets-Sheet 7
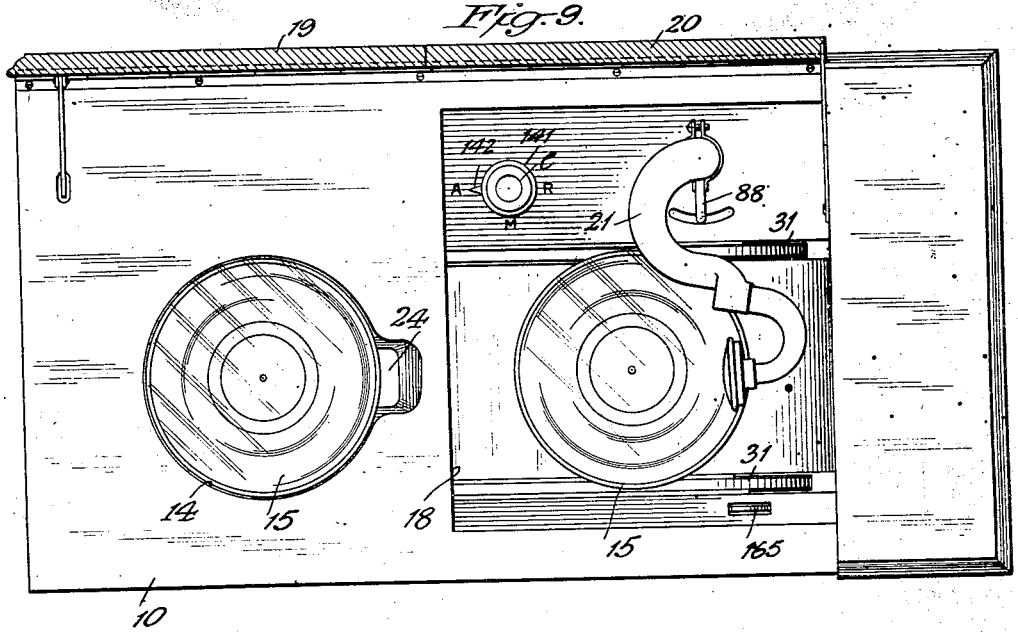
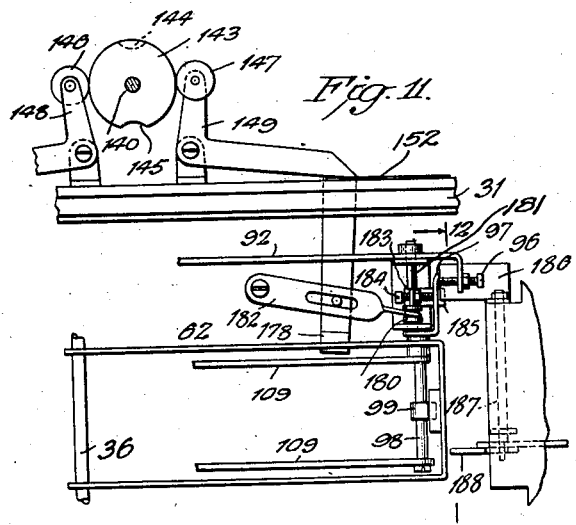
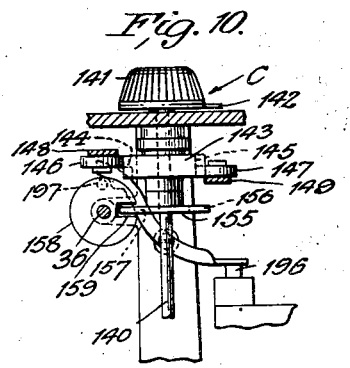
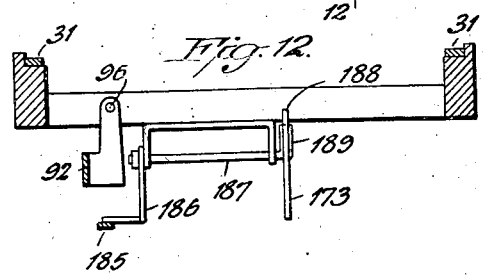
INVENTOR.
G. H. Pittman
BY
Williams & Morse
ATTORNEYS.

Patented Apr. 28, 1931

1,802,831

UNITED STATES PATENT OFFICE

GEORGE H. PITTMAN, OF JACKSON HEIGHTS, NEW YORK

PHONOGRAPH

Application filed July 15, 1927. Serial No. 205,904.

This invention relates to phonographs of the automatic type adapted to contain a plurality of records which are automatically transferred from the magazine or source of supply to the turntable of the phonograph, and after playing are automatically removed from the turntable and delivered to a receptacle.

The general object of the present invention is to provide a new and improved machine of the character above mentioned which is compact and simple in construction and reliable in operation, and which besides providing for the successive playing of a plurality of records which are automatically supplied to and removed from the turntable, also provides for repeated playing of a record and for the substitution of ordinary manual control for the automatic control of the machine.

Other objects and advantages of the invention will become apparent from the following description, taken in connection with the accompanying drawings in which—

Figure 1:
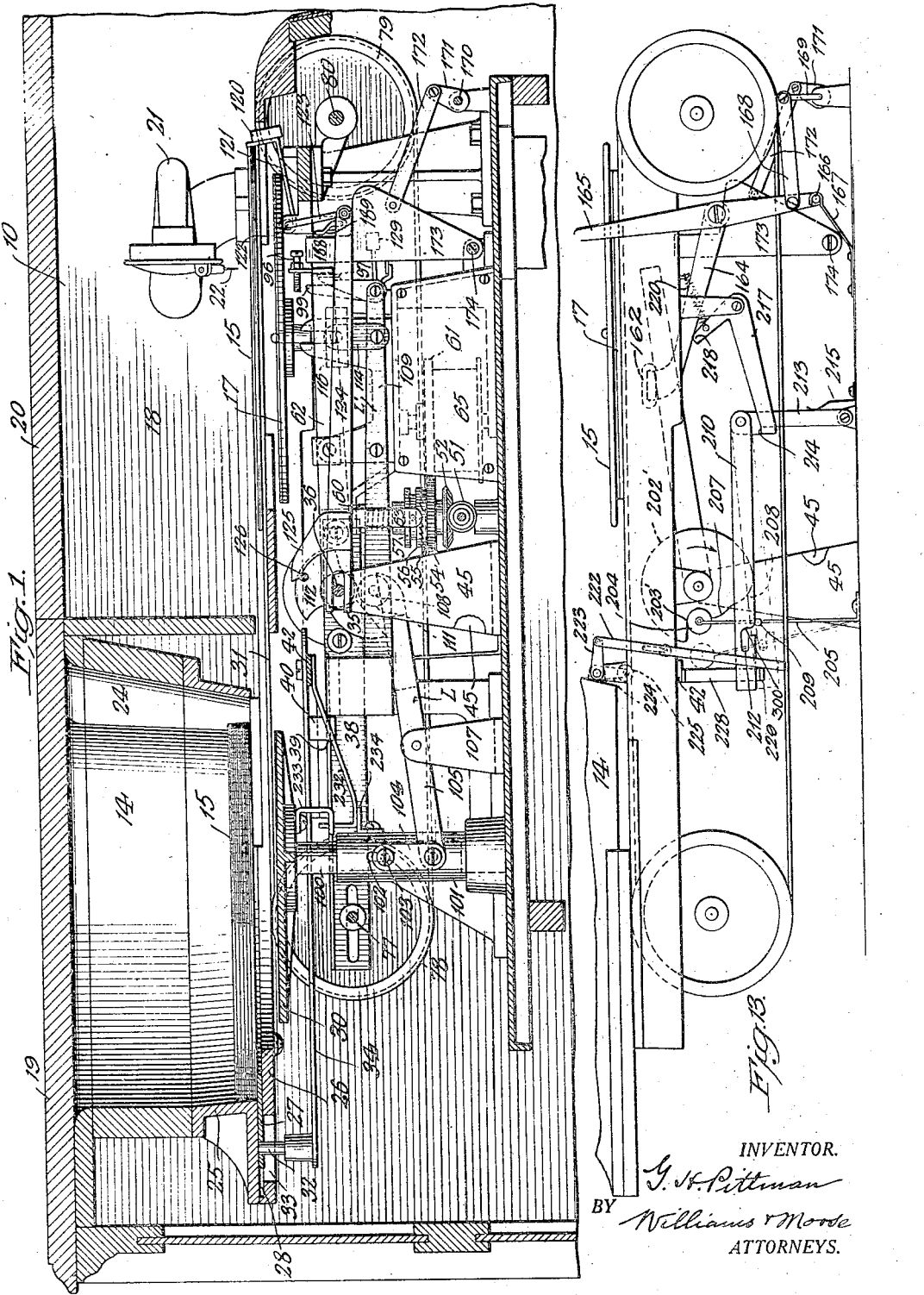
Figure 2:
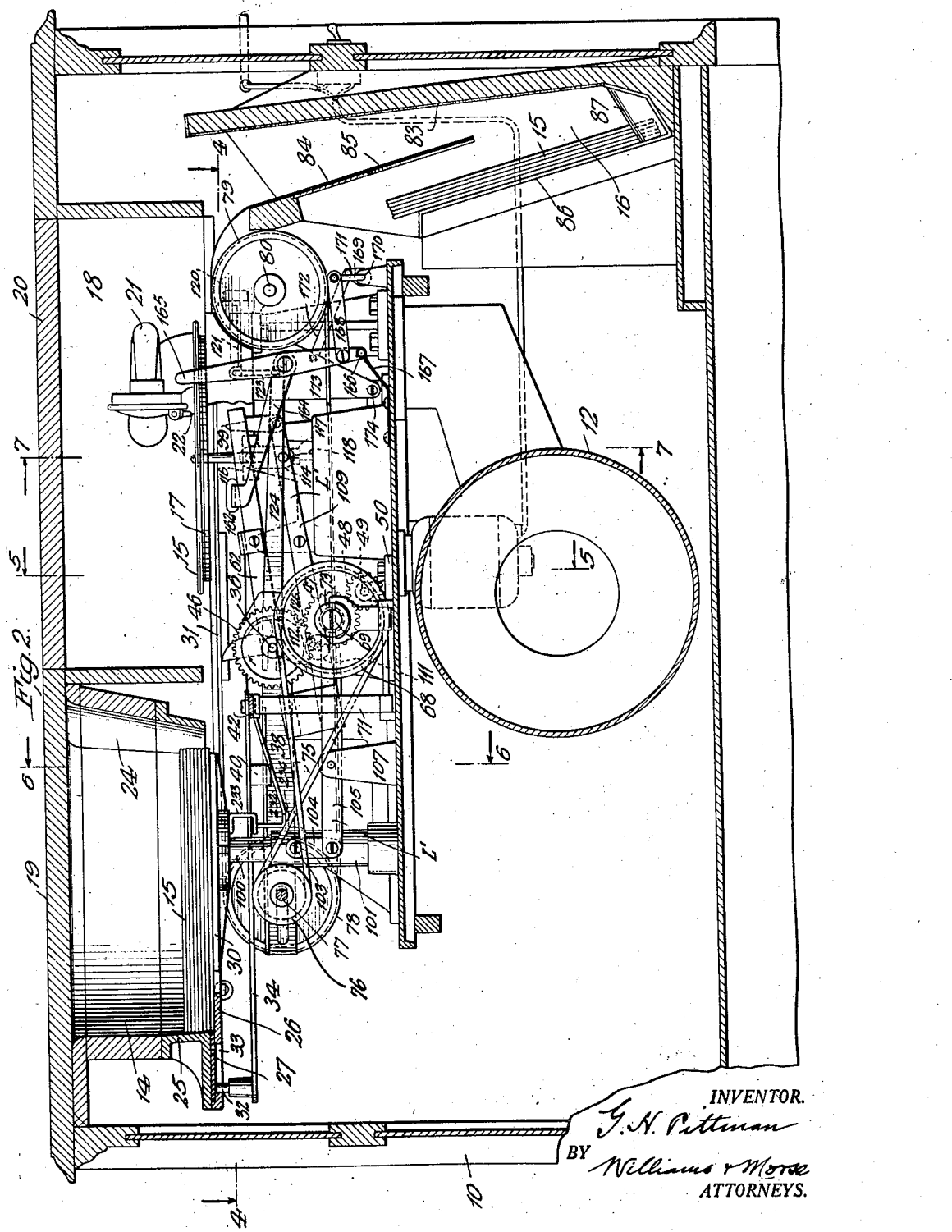
Figure 3:
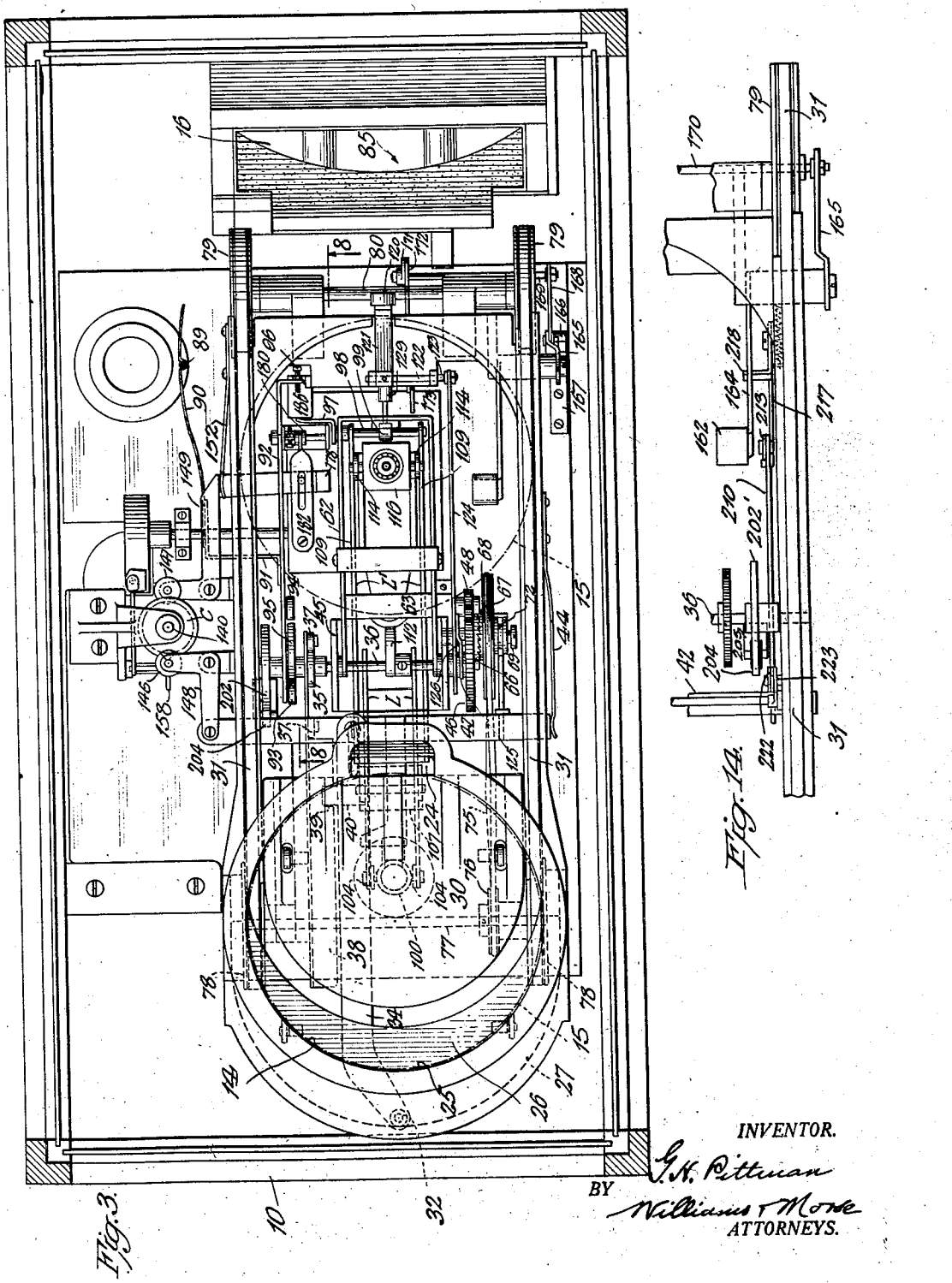
Figure 4:
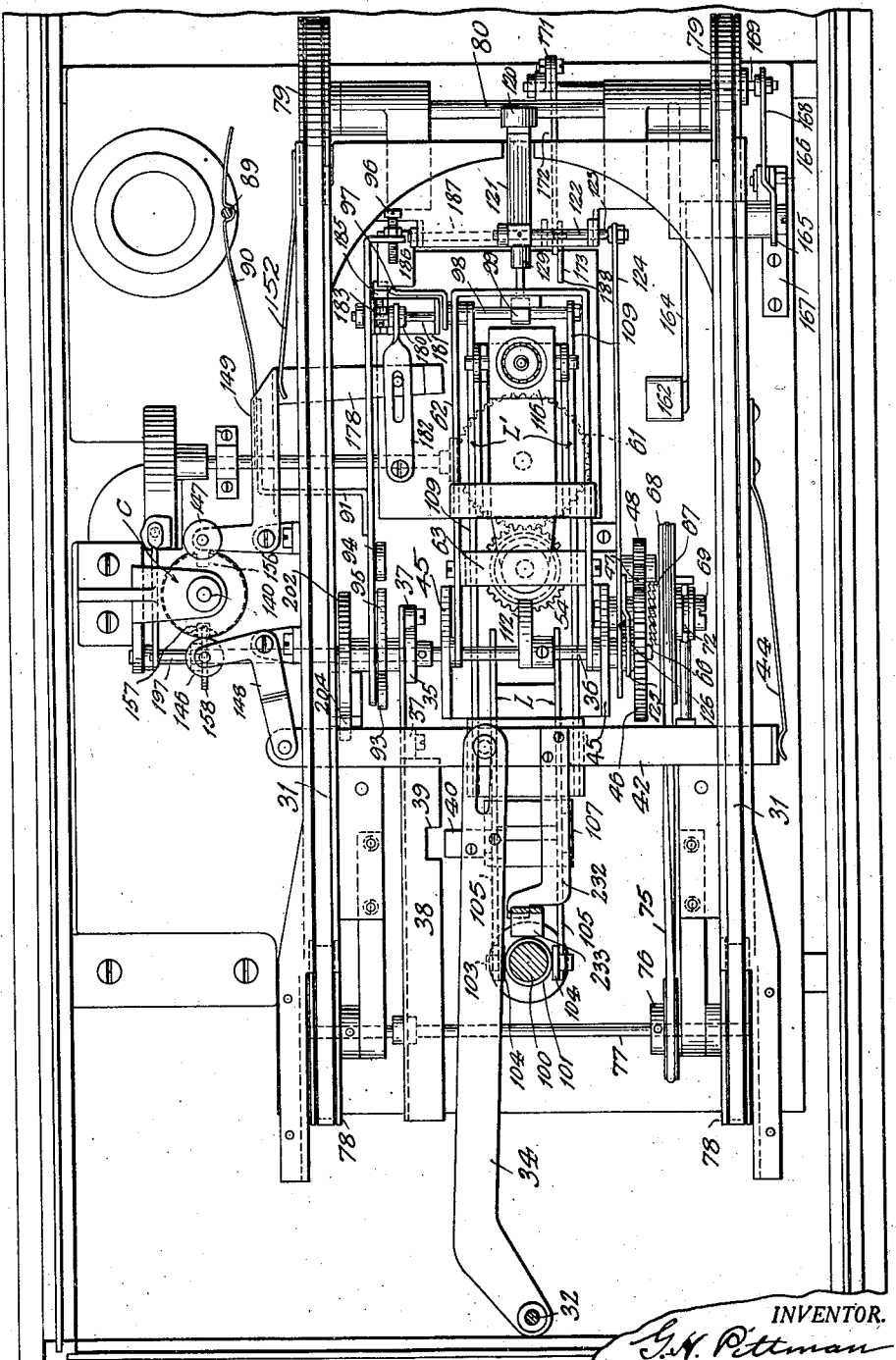
Figure 5:
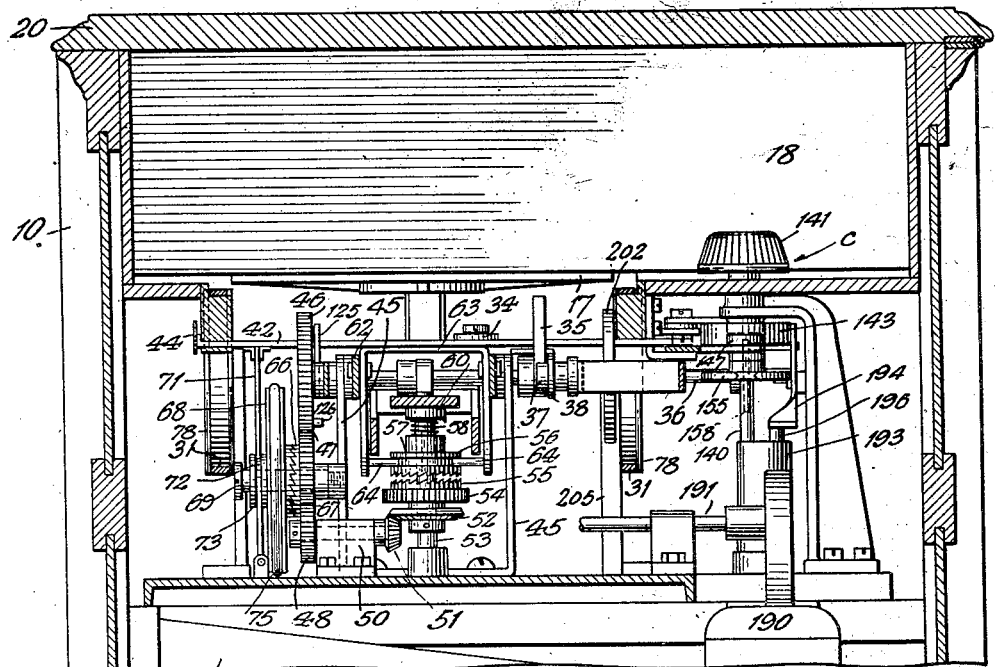
Figure 6:
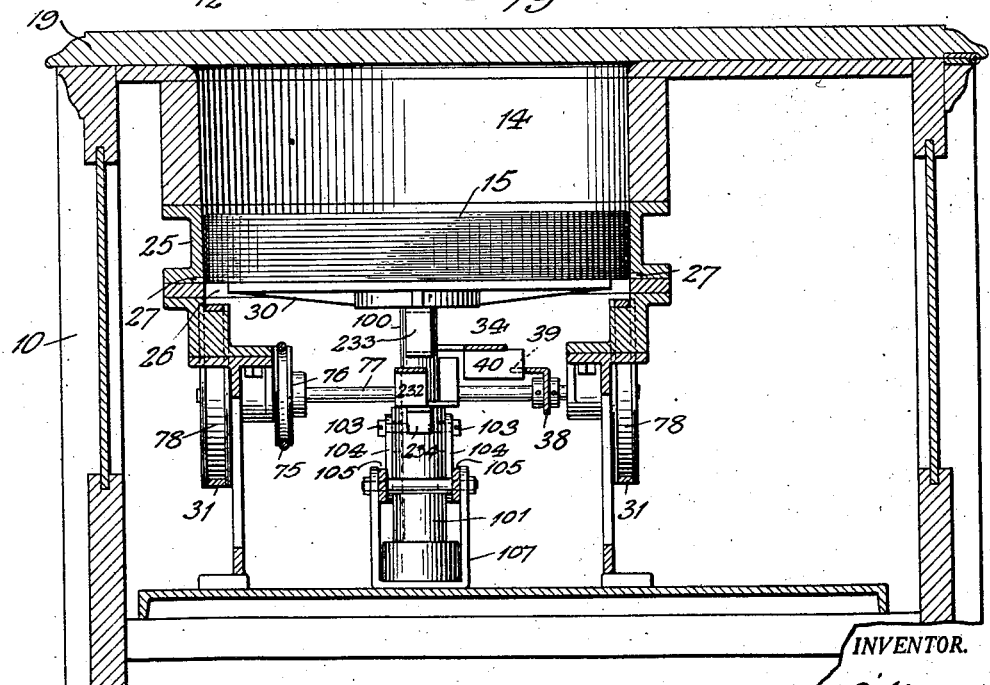
Figure 7:
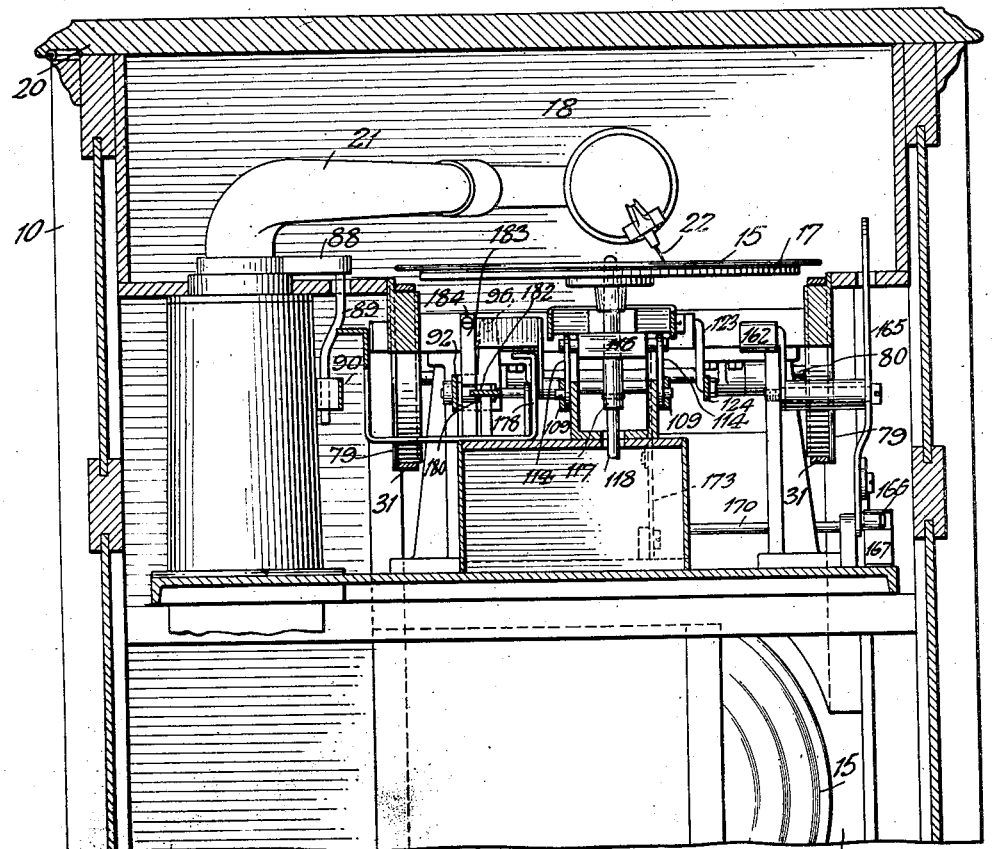
Figure 8:
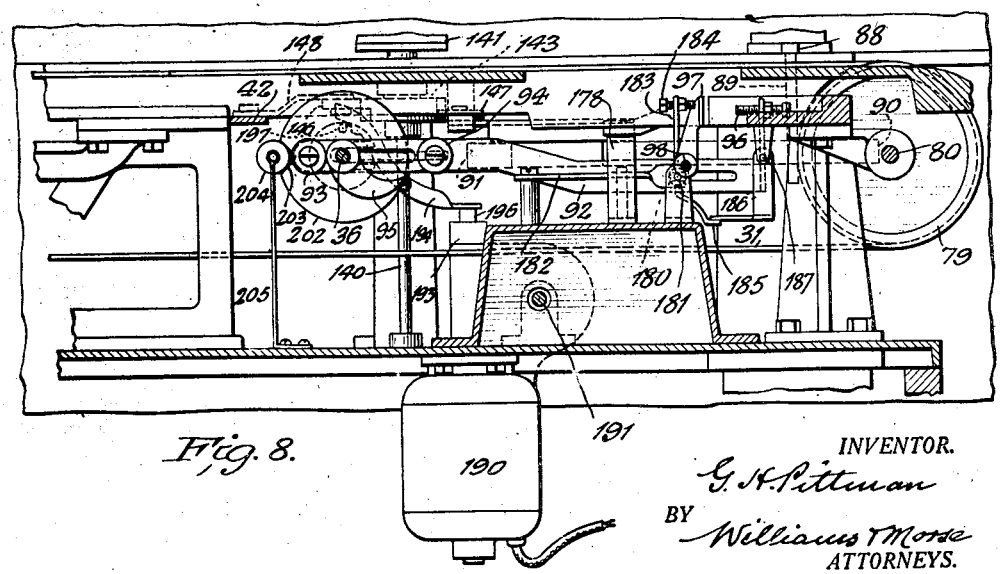

Figure 1 is a fragmentary vertical sectional view through the machine and showing a record as having been transferred from the magazine to a position directly above the turntable to be there received by such turntable as it moves to its uppermost or playing position. Figure 2 is a view similar to Figure 1 and showing the record as having been received by the turntable. Figure 3 is a plan view of the machine with the upper portion of the cabinet, the turntable and tone arm removed. Figure 4 is a fragmentary view taken on line 4—4 of Figure 2, and showing the control mechanism so positioned as to render the record transferring mechanism inoperative and to effect repeated playing of a record. Figure 5 is a vertical sectional view taken on the line 5—5 of Figure 2. Figure 6 is a vertical sectional view taken on the line 6—6 of Figure 2. Figure 7 is a vertical sectional view taken on the line 7—7 of Figure 2. Figure 8 is a fragmental, vertical, sectional view taken on the line 8—8 of Figure 3. Figure 9 is a plan view of the machine with its covers raised. Figure 10 is a detail view of the control mechanism and the mechanism for closing the switch of the electrically operated device for rewinding the spring motor of the phonograph. Figure 11 is a detail view of means for automatically operating the brake mechanism to stop the turntable upon the completion of the playing period when the control mechanism, shown in Figure 10, is set to render the record-transferring mechanism and also the repeating mechanism inoperative. Figure 12 is a sectional view taken on the line 12—12 of Figure 11. Figure 13 is a fragmentary view showing in elevation automatic means for stopping the turntable upon the completion of each playing period, when the control mechanism, shown in Figure 10 is set to render the record-transferring and repeating mechanisms inoperative; and Figure 14 is a fragmentary plan view of mechanism shown in Figure 13.

Referring to the drawings, the numeral 10 indicates a cabinet adapted to house the phonograph horn 12 and the operating mechanism hereinafter more particularly described. The cabinet 10 is provided at one end with a record magazine 14, adapted for the reception of a plurality of records 15 in a stacked relation, the opposite end of the cabinet being provided with a compartment or chamber 16, adapted to receive the played records as they are transferred from the phonograph turntable 17 which is located within a compartment 18 adjacent the magazine 14. A pair of covers 19 and 20 may be hinged to the top of the cabinet 10, the cover 19 being adapted to close the magazine 14 and the cover 20 being adapted to close the compartment 18.

The horn 12 extends, as shown most clearly in Figures 2 and 7, up to the compartment 18 and is there connected to a reproducing device including a tone arm 21, which is adapted to swing horizontally as the phonograph needle 22 progresses toward the center of the record to be played during the playing period.

The magazine 14 is open at its upper end and is so dimensioned that the records substantially fit therein, with the result that as one record is dropped upon another, an air cushioning effect is produced which allows the succeeding records to gradually descend without danger of breaking. However, in order to permit the records to be easily withdrawn from the upper end of the magazine 14, its wall may be relieved, as shown at 24, to enable one to insert the hand and grasp the records as will be readily appreciated. The magazine 14 includes an annular metallic ring or casting 25, provided with a crescent shaped ledge plate 26 which projects an appreciable distance inward with respect to the center of the magazine, as shown most clearly in Figures 1, 2 and 3, the ledge serving to normally support the records in a stacked relation and to prevent the records from becoming unduly dislodged as the lowermost record of the stack is being ejected preparatory to its transferral to the turntable 17. The lowermost record within the magazine 14 is ejected by means of a reciprocating ejector 27 which is also crescent shaped and adapted to be completely housed, when retracted as shown in Figure 2, within an arcuate space 28 formed between the crescent shaped ledge plate 26 and the ring 25. This ejector is of a thickness substantially equal to the thickness of each record 15 and is of a width such that it will so move the lowermost record free of the edge of the ledge plate 26, thus permitting the record being projects through an elongated slot 33 formed platform 30, from which it is deposited on to a pair of conveyor belts 31, to be thereafter transferred to the turntable 17, as will hereinafter more clearly appear. The ejector 27 is provided with a depending pin 32 which projects through an elongated slot 33 formed in the ledge plate 26 and to which is pivotally connected a reciprocating bar 34 which derives its forward and reverse ejector movements from a suitably shaped cam 35 carried by a horizontally disposed cam shaft 36, the cam 35 being adapted to alternately engage cam rollers 37 carried by a horizontally disposed slide bar 38. This slide bar 38 is provided with a notch 39, adapted to receive a tongue 40 carried by the reciprocating bar 34, thus locking the reciprocating bar 34 to the slide bar 38 when it is desired to effect successive transferral of the records 15 from the magazine 14 to the turntable 17. Locking and unlocking of the reciprocating bar 34 with the slide bar 38 is effected by means of a transversely disposed control bar 42, to which the reciprocating bar 34 is pivotally and slidably connected, the control bar 42 being moved to its position shown in Figure 4 by the control mechanism shown in Figure 10, and hereinafter more particularly described, and moved in an opposite direction by means of a spring 44 to establish interlocking engagement of the tongue 40 with the slide bar 38.

It sometimes happens that records become slightly dished, and in order to insure proper engagement of the ejector 27 with the periphery of such dished records, regardless of whether they are placed in the magazine 14 with their bilged centers up or down, the upper surface of the platform 30 is slightly cupped or hollowed out from its peripheral edge towards its center and the upper face of the ledge 26 is very slightly relieved so that it constitutes a continuation of the cupped surface of the platform 30. When a record is placed in the magazine with its bilged center down, such bilged center is accommodated within the hollow of the platform 30, leaving the peripheral margin of the distorted record resting upon the ledge 26 in a position to be engaged by the ejector 27 in the same manner as though the record were in a flat condition. In the event the distorted record is so placed in the magazine that its bilged center projects up, rather than down, its peripheral margin is supported upon the ledge 26 in a position to be engaged by the ejector 27 and the bilged center is free to move in an unobstructed manner across the lower face of the next superimposed record. Inasmuch as the ledge 26 is so slightly relieved and the platform 30 is so slightly cupped, the intended contour of the upper surfaces of the ledge and platform does not clearly appear in the drawings because of the relatively small scale to which such drawings are made.

The cam shaft 36 is journaled in a pair of bearings 45 and carries at one end a gear 46 which meshes with an intermediate gear 47, driven by a pinion 48, carried by a shaft 49, mounted on a suitable bearing 50 and provided at one end with a beveled gear 51. The beveled gear 51 meshes with a beveled gear 52, keyed to a vertical shaft 53, upon which is rotatably mounted a spur gear 54, carrying a clutch element 55 adapted to engage a companion clutch element 56, slidably mounted upon the shaft 53 and splined thereto, the clutch element 56 being provided with a groove 57 and normally urged toward the clutch element 55 by a thrust spring 58, one end of which engages the clutch element 56 and the other end of which engages a collar 60 carried by the shaft 53. Under certain conditions, the clutch element 56 is lowered into engagement with the clutch element 55 thereby locking the gear 54 to the shaft 53, and under other conditions, the clutch element 56 is moved out of engagement with the clutch element 55 by a U-shaped lever 62 pivoted to the cam shaft 36 and carrying a clutch operating yoke 63, the arms of which are provided with pins 64 projecting into the groove 57. The gear 54 meshes with a driving gear 61, as shown in Figure 1, which is driven by a suitable motor 65, herein shown as a spring motor, which is also suitably connected by means not shown, to the turntable 17 for effecting rotation thereof. It is when the clutch element 56 is moved into engagement with the clutch element 55 that the cam shaft 36 is driven through the train of gears 46, 47 and 48. The hub portion of the gear 47 constitutes a clutch member 66, adapted to cooperate with a similar clutch member 67 carried by a pulley 68, slidably mounted upon a stub shaft 69, engagement and disengagement between the clutch members 66 and 67 being effected by moving the pulley 68 in one direction or the other upon the stub shaft 69. In order to accomplish such movement of the pulley 68, the control bar 42 is provided with a depending arm 71 which operates within a groove 72 provided in the hub portion 73 of the pulley 68. The pulley 68 is connected by a belt 75 to a pulley 76 carried by a shaft 77 to which are secured pulleys 78 over which the conveyor belts 31 travel. The conveyor belts 31 also pass over pulleys 79 carried by a shaft 80 located at the opposite end of the machine. It is when the clutch members 66 and 67 are disconnected from each other, as shown in Figure 4, that the conveyor belts 31 are rendered inoperative, such inoperativeness being desirable when the ejector 27 is rendered inoperative by reason of the control bar 42 having been moved to its position shown in Figure 4, by the control mechanism C shown in Figures 4, 5 and 10. It will be understood that, when the control mechanism C is positioned as shown in Figure 3, the ejector 27 is rendered operative, since the tongue 40 enters the notch 39 of the slide bar 38, and that the clutch element 67 is moved into engagement with the clutch element 66, thereby rendering the conveyor belts 31 operative so as to transfer the successively ejected records to the turntable 17 and remove such records from the turntable after having been played, whereupon they are directed into the chamber 16.

The chamber 16 into which the records are successively transferred from the turntable 17 is preferably lined with a suitable material such as felt 83, so as to produce a cushioning effect as the records slide down an inclined chute 84 on to which they are deposited from the conveyor belts 31. This chute 84 is cut away, semi-circularly, as shown at 85 in Figure 3, so that the records may, after first striking the cushioning element 87 at the bottom of the chamber 16, fall flatly on to the inclined support 86 immediately below the chute 84 where they are stacked one upon the other in a face-to-face relation.

During the playing of a record, the tone arm 21 moves from right to left, as viewed in Figures 1 and 2 towards the center of the record, carrying with it an arm 88, as shown in Figure 7, to which is connected a depending pin 89. This pin 89 engages and interlocks with a resilient strap 90, as shown in Figure 3, which is connected to an angle iron 91, secured to a reciprocating trip bar 92, provided at one end with a pair of cam rollers 93 and 94 adapted to cooperate with a cam 95 carried by the cam shaft 36. As the tone arm swings toward the center of the record, during the playing thereof, the trip bar 92 is carried toward the left, as viewed in Figure 3, sufficient clearance being provided between the cam roller 94 and the cam 95 to permit the required movement of the tone arm. Immediately after the playing of a record and pursuant to the transferral of another record from the magazine 14 to the turntable 17, the cam shaft 36 begins to rotate, when set into operation by means to be hereinafter described, whereupon the cam 95, coacting with the cam roller 93 serves to move the tone arm further toward the center of the record, such additional movement being necessary in order to permit the left hand edge of the played record, as viewed in Figure 2, to clear the phonograph needle 22 as the record tilts from a horizontal position upon the conveyor belts 31 to an inclined postion in passing on to the chute 84. Upon continued rotation of the cam shaft 36, the cam 95 coacts with the cam roller 94 to return the trip bar 92 to its normal position, thus returning the tone arm 21 to its starting position so that the phonograph needle 22 may engage the record next to be played at the proper point near its periphery when such record is lifted from the conveyor belts 31 by the turn table 17 and moved into playing position as shown in Figure 2.

An added function of the trip bar 92, upon the completion of the playing of a record, is to automatically start the machine in its cycle of operation, so as to eject from the magazine 14 the next record to be transferred to the turntable 17, the previously played record being simultaneously removed from the turntable by the conveyor belts 31 and deposited in the chamber 16. To accomplish this, the trip bar 92 is provided at one end with an angular portion carrying a set screw 96, as shown in Figure 3, which is adapted to engage a trip arm 97 when the trip bar 92 is moved a predetermined distance towards the left, as viewed in Figure 3, by the movement of the tone arm 21 towards the center of the record. Upon engagement of the set screw 96 with the trip arm 97, a rocker shaft 98 is so turned as to move a trigger 99, carried by said rocker shaft, from under the U-shaped lever 62 which carries the clutch operating yoke 63 so as to permit the U-shaped lever 62 to drop by gravity, thus moving the clutch member 56 into engagement with the clutch member 55, whereby the motor 65 is operatively connected to the cam shaft 36 through the train of gears 46, 47 and 48 and operation of the conveyor belts 31 is effected through the pulleys 68 and 76 and the belt 75. As soon as the cam shaft 36 begins to rotate and the conveyor belts 31 begin to move, the ejector plunger 27 moves forward while the platform 30 is in its elevated position as shown in Figure 2, thus moving the lowermost record free of the ledge plate 26, so that as the platform 30 is lowered such record is deposited upon the conveyor belts 31 to be thereafter transferred to the turntable 17. However, during such time as the platform 30 is being lowered, the turntable 17 is also being lowered as will hereinafter more clearly appear, so that the played record is deposited upon the moving conveyor belts 31 and thereafter transferred to the chamber 16. The platform 30 is connected to the upper end of a vertically movable post 100 housed within a sleeve 101, having a pair of slots 102 formed therein through which project a pair of pins 103 carried by the post 100. These pins 103 are pivotally connected to a pair of links 104 which in turn are pivotally connected to the parallel side member 105 of a rocker-lever L, which is pivotally connected intermediate its ends to a suitable support 107. The free end of the rocker-lever L is located below and adapted to slidably engage a transverse shaft 108 carried by the free ends of a pair of parallel side members 109 which constitute a second rocker-lever unit L', the transverse shaft 108 being provided with a cam roller 111 directly below and adapted to coact with a cam 112 secured to the cam shaft 36. To the side members 109 of the second rocker-lever L' are pivotally connected a pair of links 114 which in turn are pivotally connected to a vertically movable bearing 116 in which is journaled a sleeve 117, slidably keyed to a driving shaft 118 which derives its power of rotation from the motor 65, the sleeve 117 serving as a driving shaft on which the turntable 17 is mounted. By reason of the slidable connection afforded between the sleeve 117 and the driving shaft 118, the turntable 17 may be raised and lowered without disturbing the rotation thereof. The platform 30 and turntable 17 are both retained in their uppermost positions, as shown in Figure 2, during the playing period of the record by reason of the fact that the cam 112 which is adapted to cooperate with the cam roller 111, is normally so positioned as to maintain the cam roller 111 in its depressed position. However, when the machine is set in operation to transfer a record from the magazine 14 to the turntable 17 and to remove a previously played record from the turntable 17, the cam shaft 36; upon rotating a sufficient distance, so moves the cam 112 as to permit the cam roller 111 to move from its depressed position into its position shown in Figure 1, with the result that the platform 30 and turntable 17 move by gravity to their respective positions shown in Figure 1. After the previously played record has been removed from the turntable 17 and deposited in the chamber 16 and after the next record to be played has been transferred to a position directly above the turntable 17, the cam 112 serves to depress the cam roller 111 and thereby lift the platform 30 and turntable 17 to their normal positions shown in Figure 2. As the turntable 17 moves to its normal position, the record positioned above the same and to be next played, is lifted from the conveyor belts 31, and in the meantime the phonograph needle has been returned by the tone arm to its starting position on the peripheral margin of the record. In order that the records, as they are transferred from the magazine 14, may be properly located above the turntable 17, when such table is in its position shown in Figure 1, an indexing stop 120 is provided. This stop 120 is carried by an arm 121, secured to a shaft 122 carrying a depending arm 123, to which is pivotally connected an actuating bar 124, slidably supported at one end upon the cam shaft 36 and carrying at such supported end a cam finger 125, adapted to be engaged by a pin 126 carried by the gear 46, as shown most clearly in Figures 1, 3, and 5. Engagement of the pin 126 with the cam finger 125 takes place subsequent to the transferral of a played record from the turntable 17 to the chamber 16 and prior to such time as the next record to be played is moved into a position directly above the turntable 17, with the result that the actuating bar 124 moves toward the right, as viewed in Figure 1, thus lifting the indexing stop 120 to its position shown in Figure 1 in time to prevent the record from being moved beyond the correct position during such time as the conveyor belts 31 continue to move after the record has reached its proper position above the turntable 17. Upon continued movement of the gear 46 carrying the pin 126, such pin is freed from engagement with the cam finger 125, whereupon the indexing stop 120 drops by gravity to its normal position shown in Figure 2, thus moving the actuating bar 124 towards the left into its normal position shown also in Figure 2. After the turntable 17 has been elevated to its playing position, shown in Figure 2, operation of the cam shaft 36 and conveyor belts 31 is discontinued due to the fact that the clutch element 56 is disengaged from the clutch element 55. Such disengagement of the clutch element 56 from the clutch element 55 is accomplished by effecting an interlocking connection between the U-shaped lever 62 and the rocker-lever L' at such time as the turntable 17 is lowered to its position shown in Figure 1, so that as the rocker-lever L' is elevated by the cam 112, the U-shaped lever 62 is likewise elevated to its normal position, shown in Figure 2, with the result that the clutch member 56 is moved out of engagement with the clutch member 55, as shown in Figure 5. The interlocking of the rocker-lever L' with the U-shaped lever 62 is effected by the trigger 99 which is moved by a weighted arm 129 into a position under the U-shaped arm 62 after the rocker-lever L', which carries the shaft 98 to which the trigger 99 is connected, has been lowered by the weight of the turntable 17, movement of the trigger 99 into its locking engagement with and reset position with respect to the U-shaped lever 62 being permitted by reason of the fact that the cam shaft 36 has in the meantime so rotated as to move the trip bar 92 a sufficient distance towards its normal position, shown in Figure 3, to provide a substantial clearance between the set screw 96 and the trip arm 97. After the trigger 99 has moved under the U-shaped lever 62 and such lever has been elevated, the reset position of the trigger 99 is maintained until it is again moved out from under the lever 62, upon completion of the playing of the record, to thereby establish engagement of the clutch member 56 with the clutch member 55 preparatory to the removal of the played record from the turntable 17 and the transferral of another record from the magazine 14 to the turntable.

The control mechanism C shown most clearly in Figures 4, 5 and 10 includes a vertically disposed shaft 140, carrying at its upper end a control knob 141 with which is associated a pointer 142 which indicates the setting of the control mechanism with reference to its "automatic", "repeat" and "manual" positions when taken in connection with the indicia "A" "R" "M" shown in Figure 9. To the shaft 140 is secured a disc 143 which is provided with diametrically opposed notches 144 and 145, one of which, namely the notch 144, is located at one side of a plane passing centrally through the disc perpendicularly to the axis thereof. These notches 144 and 145 are adapted for the reception of rollers 146 and 147 carried respectively by bell crank levers 148 and 149, pivotally mounted as shown in Figure 4 so as to swing horizontally. The bell crank lever 148 is pivotally connected to the control bar 42. When the machine is rendered wholly automatic so as to transfer the records successively from the magazine 14 to the turntable 17 and return the tone arm 21 to its starting position for each record, the disc 143 is so positioned that the roller 147 rests within the notch 144 and the roller 146 rests within the notch 145. When the roller 146 is positioned within the notch 145, the control bar 42 is so held by the spring 44 as to maintain the tongue 40 within the notch 39 of the slide bar 38 so as to effect operation of the ejector slide 27. While the ejector slide 27 is so connected with the slide bar 38, the roller 147 is of necessity at rest in the notch 144, it being held there by a spring 152 which coacts with the bell crank lever 149. During such time as the roller 147 is held in the notch 144, the U-shaped lever 62 may be tripped so that rotation of the cam shaft 36 may be effected as above described.

When it is desired to discontinue the transferral of records from the magazine 14 and effect repeated playing of a record on the turntable 17, the knob 141 is turned so that the pointer 142 is positioned at "R". In turning the knob from automatic position to repeat position, the roller 146 rides out of the notch 145, thus removing the tongue 40 from the notch 39 in the slide bar 38 and at the same time an arm 232 carried by the control bar 42 is moved into position intermediate brackets 233 and 234 carried, respectively, by the platform 30 and the sleeve 101 which houses the vertically movable post 100 to which the platform 30 is connected. Under such conditions, the arm 232 serves to lock the platform 30 in its uppermost position during repeated playing of a record. As the roller 146 moves out of the notch 145, the roller 147 rides out of the notch 144 and thereafter enters the notch 145. Although the notches 144 and 145 are diametrically opposed to each other, the roller 146 cannot enter the notch 144 as the roller 147 enters the notch 145, due to the fact that the notch 144 is located at one side of a plane passing centrally through the disc 143 perpendicularly to the axis thereof and the roller 146 is located at the opposite side of such plane. Under such conditions, the bell crank lever 148 is moved to its position shown in Figure 4, thereby rendering the ejector slide 27 and the conveyor belts 31 inoperative, the ejector slide being rendered inoperative due to the withdrawal of the tongue 40 from the notch 39 and the conveyor belts being rendered inoperative due to the fact that as the control bar 42 is moved to its position shown in Figure 4, the clutch element 67 is moved out of engagement with the clutch element 66 by the arm 71. However, since the position of the bell crank lever 149 is the same when the roller 147 is in the notch 145 as it was when the roller 147 was in the notch 144, periodic operation of the cam shaft 36 may be effected as the trigger 99 is intermittently released from the U-shaped lever 62, and repeated lowering and raising of the turntable 17 as well as repeated return of the tone arm 21 may be accomplished so long as the control knob 141 is maintained in repeat position.

It is desirable to lock the control knob 141 against being turned from its repeat position to its automatic position or vice versa until a cycle of operation has been completed, during which cycle the cam shaft 36 undergoes one complete operation, and to provide for such locking of the control knob 141 after the cam shaft 36 has begun to rotate, suitable interlocking mechanism is provided, such mechanism being shown most clearly in Figures 5 and 10. This interlocking mechanism includes a disc 155 which is secured to the shaft 140 and provided with diametrically opposed notches 156 and 157, within one or the other of which, depending upon the position of the control knob 141, a disc 158 is adapted to operate, the disc 158 being secured to the cam shaft 36 and provided with a notch 159. While the cam shaft 36 is at rest, in its position shown in Figure 10, the control knob 141 may be turned from its repeat position, shown therein, to either manual or automatic position as desired, due to the fact that the peripheral margin of the disc 155 may be rotated through the notch 159 in the disc 158 without interference. However, after the cycle of operation has begun, i. e., after the cam shaft 36 begins to rotate, the control knob 141 cannot be moved from its repeat position, shown in Figure 10, inasmuch as the peripheral margin of the disc 158 enters the slot 157 of the disc 155. On the other hand if the control knob 141 is in automatic position when the cycle of operation begins, such knob is restrained against movement due to the fact that the peripheral margin of the disc 158 enters the slot 156 of the disc 155. At such time as the control knob 141 is maintained in an intermediate or manual position, the peripheral margin of the disc 155 is maintained within the notch 159 of the disc 158 thereby preventing rotation of the cam shaft 36 in the event engagement between the clutch elements 55 and 56 were established because of any unanticipated reason. Should it be desired to move the control knob 141 from manual position to either the automatic or the repeat position, such adjustment may be made at any time during the playing of a record. If the control knob 141 is moved from manual position to automatic position during the playing of a record, then, upon completion of the playing period, transferral of a record from the magazine 14 to the turntable 17 and removal of the previously played record from the turntable is effected as above described. On the other hand if the control knob 141 is moved from manual position to repeat position during the playing of a record, no transferral of records takes place upon the completion of the playing period, but on the other hand upon such completion the turntable 17 is lowered and raised during which time the tone arm 21 is returned to its starting position so that the needle 22 engages the record as it is lifted to its normal playing position shown in Figure 2. Since the cam shaft 36 is at rest during the record playing period, it also follows that the control knob 141, during the playing of a record, may be moved from its automatic position to either the manual or repeat position, or from its repeat position to either the manual or automatic position, with the result that when the new cycle of operation is begun the operation of the machine is in accordance with the final position to which the control knob has been moved during the record playing period, the final position being that position in which the control knob is at rest upon the completion of the playing period.

The turntable 17 is started and stopped by a friction brake 162 adapted to engage the lower face of the turntable 17. This friction brake 162 is carried by an arm 164, secured to a lever 165 which is pivoted intermediate its ends to a suitable support and projects up into the compartment 18. The lower end of the lever 165 is provided with a pin 166 which is adapted to cooperate with a flat spring 167, the spring 167 being so shaped as to retain the lever 165 in either of its extreme positions, and is adapted to so cooperate with the pin 166 as to move the lever 165 with a snap action into either one of its extreme positions upon initial movement thereof towards one or the other of such positions. To the lower end of the lever 165 is pivotally connected a link 168 which in turn is connected to an arm 169, carried at one end of a shaft 170, the other end of the shaft being provided with an arm 171 to which is pivotally connected a link 172. This link 172 is pivotally connected to a safety support 173 which is pivotally supported at its lower end, as shown at 174. By the system of links just described, it will be apparent that when the lever 165 is so moved as to apply the brake 162, the safety support 173 is moved to the left, as viewed in Figure 2, to a position directly beneath the U-shaped lever 62. Inasmuch as the safety support 173 is positioned below the U-shaped lever 62 during such time as the brake 162 is applied, it follows that the U-shaped lever 62 cannot be dropped even though the trigger 99 is released because of any unforeseen reason.

In order to render the machine inoperative in so far as automatic transferral of records to and from the turntable 17 is concerned, and in so far as the automatic repeating of a record is concerned, the control knob 141 may be positioned so that the pointer 142 is directed toward the indicia "M" shown in Figure 9. When the control knob 141 is so positioned, the disc 143 is positioned as shown in Figure 11, in which case the rollers 146 and 147 rest upon the periphery of the disc 143, thereby holding the control bar 42 in its position shown in Figure 4, and at the same time holding the bell crank lever 149 in its position shown in Figure 11. As the bell crank lever 149 is moved from its position shown in Figure 4 to its position shown in Figure 11, a supporting arm 178 carried by such lever is moved to a position directly beneath one leg of the U-shaped lever 62 with the result that such U-shaped lever is prevented from dropping when the trigger 99 as previously described, is moved from beneath the same by the tone arm 21 upon the completion of the playing period. Incidentally, the arm 232 carried by the control bar 42 is positioned intermediate the brackets 233 and 234 during such time as the control mechanism C is maintained in manual position, thus further insuring the platform against dropping during such time as the control knob 141 remains in the manual position. Inasmuch as the U-shaped lever 62 is prevented from dropping upon the completion of the playing period, it follows that the clutch member 56 cannot move into engagement with the clutch member 55 and thus rotation of the cam shaft 36 is prevented. Upon completion of the playing period, the tone arm 21 may be manually returned to its starting position leaving the record free to be manually removed from the table.

At the completion of each playing period, while the control knob 141 is in manual position, the turntable 17 is automatically stopped by the application of the brake 162. This automatic operation of the brake 162 is effected by suitable means which includes a slidable sleeve 180 mounted upon a rod 181, the sleeve 180 being adapted to be moved from its position shown in Figure 4 to its position shown in Figure 11 by an arm 182 pivotally and slidably connected to the supporting arm 178 when such arm is moved from its position shown in Figure 4 to its position shown in Figure 11 by the bell crank lever 149. The sleeve 180 carries an upwardly projecting finger 183, provided with an adjustable screw 184 and a depending foot 185 which foot engages and is adapted to operate a lever 186 carried by one end of a shaft 187 to the opposite end of which shaft is connected a presser foot 189 adapted to engage the upwardly projecting tongue 188 of the safety support 173 to initially move it so as to enable the spring 167 to so act upon the lever 165 as to sway the support from its approximate position shown in Figures 1 and 2 to a position directly beneath the U-shaped lever 62. Since the safety support 173 is operatively connected with the lever 165, it follows that when the safety support 173 is moved from its position shown in Figures 1 and 2 to a position directly beneath the U-shaped lever 62, the brake 162 is applied to stop rotation of the turntable 17. Movement of the depending foot 185 in the desired direction to stop the turntable 17, as described, is accomplished by reason of the fact that when the sleeve 180 is moved from its position, shown in Figures 3 and 4, to its position shown in Figure 11, the screw 184 is moved into a position behind the trip arm 97 so that as the trip arm 97 is moved at the completion of the playing period, the sleeve 180 is moved about its shaft 181.

Electric means for automatically storing energy in the spring motor 65 is herein shown as a well known type of automatic rewind device 190 which is operatively connected to the arbor 191 of the motor. The electric circuit through the motor of the winding device 190 is automatically closed by means of a switch 193 which is actuated by a presser arm 194 pivotally connected intermediate its ends to a suitable support, one end of the presser arm being in engagement with the push button 196 of the switch 193 and the other end of such arm being adapted to intermittently engage a pin 197 carried by the disc 158, shown most clearly in Figures 4 and 10, so that as the cam shaft 36 begins to rotate the presser arm 194 is lifted at one end and so lowered at its other end as to depress the push button 196 to close the circuit through the switch 193. Soon after rotation of the cam shaft 36 is begun, the pin 197 disengages the presser foot 198, leaving the push button 196 to automatically return to its normal position, thus opening the circuit after a predetermined tension has been stored in the spring motor 65.

It is desirable to insure proper positioning of the cam shaft 36 after each cycle of its operation, and to accomplish this, suitable means are provided which include a centering disc 202 which is secured to the cam shaft 36 and provided with a peripheral notch 203, into which a roller 204 is forced by a spring 205 upon which the roller is mounted. The notch 203 is so shaped that the roller 204 may easily enter the same upon completion of each rotation of the cam shaft 36 and is so shaped also as to easily force the roller 204 out of the notch 203 as the cam shaft 36 begins to rotate.

It is not essential to provide means for automatically stopping the turntable 17 after the supply of records from the magazine 14 has been exhausted and the last of such records has been removed from the turntable 17 inasmuch as the brake 162 may be manually operated to accomplish that result. However, such means may be embodied in the machine above described by slightly modifying the same as shown in Figures 13 and 14, wherein the modification resides in extending the cam shaft 36 an appreciable distance through the gear 46 and attaching to the extended end of the cam shaft a modified form of centering disc 202' in lieu of the centering disc 202. The centering disc 202' differs from the centering disc 202 in that it is provided with a notch 203' which is so shaped as to permit the roller 204 to enter with a quick snap action under the influence of the spring 205 which in the modified form of the invention, shown in Figures 13 and 14, is transposed from its position adjacent the disc 202 to a position adjacent the disc 202'. The disc 202' further differs from the disc 202 in that it is provided adjacent the notch 203' with an arcuate shaped holding face 207 which is struck from the center of the disc 202 upon which the roller 204 rides during a portion of the cycle of operation of the cam shaft 36. The disc 202' also differs from the disc 202 in that the former is provided with a cam face 208 on to which the roller 204 passes after it leaves the holding face 207, with the result that the spring 205 is urged to the left, as viewed in Figure 13, carrying with it a pin 209 which serves to impart a hammer blow to a link 210 to apply the brake 162 as will hereinafter appear. The link 210 is provided at one end with a bayonet slot 212 and is pivoted at its other end to an upright release bar 213 which is provided with a shoulder 214 and is urged toward the left, as viewed in Figure 13, by a spring 215. The shoulder 214 is adapted to engage the angular end of an arm 217 of a bell crank lever, the other arm 218 of which is adapted to engage the arm 164 which carries the brake 162. The angular shaped end of the arm 217 is urged upwardly against the shoulder 214 by a spring 220 connected at one end to the arm 218 and suitably anchored at its other end. A link lifting mechanism is provided for retaining the link 210 out of contact with the pin 209 during a portion of such time as a record is being transferred from the magazine 14 to the turntable 17. This lifting mechanism includes a vertically movable lifting arm 222 which is bent at its lower end to engage the free end of the link 210 and is pivotally connected at its upper end to an arm 223 secured to one end of a shaft 163 which carries at its other end an arm 224, provided with a roller 225 which is adapted to engage each record as it is moved forward on to the platform 30, the coaction between the roller 225 and each record being such as to lift the arm 222 and retain the same elevated so long as engagement is maintained between the roller 225 and the record being transferred from the magazine to the conveyor belts 31. If, at the beginning of each cycle, a record is presented to the roller 225, the link 210 is held free from the pin 209, with the result that such pin is prevented from entering the bayonet slot 212 during such time as the roller 204 carried by the spring 205 is passing over the holding portion 207 of the disc 202' and the cam 208 of such disc, the cam 208 serving to move the pin 209 well past the entrance to the bayonet slot 212. After the last record has been transferred to the turntable 17 and the playing period has been completed, the cycle of operation is again started and the last played record is removed from the turntable, but since no record is presented to the roller 225 the lifting arm 222 is not lifted with the result that after the roller 204 passes from the holding portion 207 of the disc 202' and begins to pass over the cam surface 208, the link 210 is permitted to drop as the pin 209 reaches the entrance to the bayonet slot 212, with the result that the pin is urged to the left within the elongated portion of the bayonet slot as the roller 204 continues to ride over the cam face 208 and on to the periphery of the disc 202'. During such time as the roller 204 travels over the periphery of the disc 202', the pin 209 is retained within the bayonet slot 212, but as soon as the roller 204 reaches the notch 203, the roller is quickly snapped into such notch by the spring 205 with the result that the pin 209 strikes the curved wall 300 of the bayonet slot 212, at the right of the entrance thereto, a sufficient blow to move the link 210 and thus move the lever 213 against the spring 215. As the lever 213 is so moved, the arm 217 is released from the shoulder 214, whereupon the arm 218 is so moved by the spring 220 as to move the arm 164 a sufficient distance to cause the lever 165 to quickly snap into stop position, whereupon the brake 162 is moved into engagement with the turntable 17. Inasmuch as the wall 300 of the bayonet slot 212 is curved, the pin 209, acting under the influence of the spring 205, readily cams itself out of the entrance to the bayonet slot after striking its hammer-like blow which actuates the link 210. When releasing the brake 162, the lever 165 is moved to the left, as viewed in Figure 13, with the result that the arm 164 engages the bell crank arm 218 and moves its companion arm 217 downwardly a sufficient distance to permit its angular end to free its engagement with the shoulder 214, whereupon the spring 215 urges the lever 213 into its position shown in Figure 13, thereby bringing the shoulder 214 into a position directly above the angular end of the bell crank arm 217, thus resetting the mechanism as to automatically stop the machine after the last record from the magazine has been played and transferred from the turntable 17 to the compartment 16.

In order to prevent the automatic stop mechanism from operating when the control knob 141 is turned to repeat position, the control bar 42 may be provided with a depending support 228 which is provided with an angular portion 229, adapted to be moved under the free end of the link 210 when the control bar 42 is moved to its position shown in Figure 4. With the angular portion 229 positioned below the free end of the link 210, such link is prevented from dropping when the cycle of operation of the cam shaft 36 is begun, with the result that the pin 209 is free to move past the entrance opening to the bayonet slot 212 as the roller 204 carried by the spring 205 is passing from the notch 203' to the periphery of the disc 202' and as such roller is passing from the periphery of the disc 202' into the notch 203' as the cam shaft 36 completes each revolution during the repeated playing of a record. Inasmuch as the pin 209 is thus prevented from entering the slot 212, the brake 162 remains in its position shown in Figure 13 until it is released and is moved into engagement with the turntable 17 by manual operation of the lever 165.

When the control knob 141 is so positioned as to render the record transferring mechanism operative, the machine upon manually releasing the brake 162 operates as follows: Assuming that a record is already upon the turntable 17 and the phonograph needle 22 is in engagement with the record at the peripheral starting point, the tone arm 21 moves from the right, as viewed in Figure 2, toward the left therein. As the tone arm 21 thus moves, it carries with it the depending rod 89 which, by reason of its interlocking engagement with the spring 90, moves the trip arm 92 towards the left, as viewed in Figure 3, thus bringing the screw 96 into engagement with the trip arm 97 at such time as the playing period has been nearly completed. Upon further movement of the tone arm 21 toward the center of the record in completing the playing thereof, the trigger 99 is released from its holding engagement with the U-shaped lever 62, whereupon such lever drops by gravity, thus moving the clutch element 56 into engagement with the clutch element 55 and thereby operatively connecting the train of gears 46, 47 and 48 with the rotating shaft 53 which derives its power or rotation from the motor 65. Inasmuch as the train of gears 46, 47 and 48 are thus operatively connected with the rotating shaft 53, rotation of the cam shaft 36 is begun. After rotation of the cam shaft 36 has begun, the cam 35 acting upon the cam roller 37 moves the slide bar 38, which is interlocked with the reciprocating bar 34, to the right, as viewed in Figure 4, with the result that the ejector 27 moves the lowermost record within the magazine 14 from the ledge 26 on to the platform 30. By such time as the record has been received upon the platform 30, the cam 112 is so moved as to permit the platform 30 and the turntable 17 to drop to their lowermost positions shown in Figure 1. Due to the lowering of the platform 30 and turntable 17, their respective records are placed upon the conveyor belts 31 which began their operation at the time the cam shaft 36 began to rotate, due to the interlocking engagement of the clutch member 67 with the clutch member 66. After the records have been placed upon the conveyor belts 31, the previously played record is transferred to the chamber 16 and the record to be next played is moved to a position directly above the turntable 17, in which position it is restrained by an indexing stop 120 against further movement toward the discharge end of the conveyor belts 31 during such time as they continue to operate after the record has been positioned as shown in Figure 1. The indexing finger 120 is moved to its position shown in Figure 1 by the actuating bar 124 as the pin 126 moves into engagement with the cam finger 125, the pin 126 being carried by the gear 46 connected to the cam shaft 36. After the record to be next played has been moved to its position over the turntable 17, as shown in Figure 1, the cam 112 acting upon the cam roller 111 moves the platform 30 and the turntable 17 to their uppermost positions shown in Figure 2, in which positions they are held by reason of the engagement of the cam 112 with the cam roller 111 until they are again lowered during the next cycle of operation. As the turntable 17 moves to its normal playing position shown in Figure 2, the record to be next played is deposited upon the turntable and lifted from the conveyor belts 31. In the meantime, cam 95, acting upon the cam roller 94, has moved the trip arm 92 to its normal position, shown in Figure 3, thereby effecting the return of the tone arm 21 to its starting position so that as the record to be next played approaches its playing position, shown in Figure 2, engagement of the phonograph needle 22 with the record at the proper starting point thereon is established. However, before the phonograph needle 22 engages the record to be next played, the pin 126 moves out of engagement with the cam finger 125, thereby permitting the indexing finger 120 to drop by gravity to its position shown in dotted lines in Figure 2. As the turntable moves to its uppermost position, the U-shaped lever 62 is lifted to its uppermost position by reason of the engagement of the trigger 99 with the U-shaped lever 62. The engagement of the trigger 99 with the U-shaped lever 62 is established by reason of the fact that as the rocker lever L' and turntable 17 are lowered, the trigger 99 is moved by gravity into a position directly beneath the free end of the U-shaped lever 62. As the U-shaped lever 62 is raised, the clutch element 56 is moved out of engagement with the clutch element 55, thereby discontinuing rotation of the cam shaft 36 at which time the roller 204 snaps into the notch 203 of the centering disc 202. After the record last presented to the turntable 17 has been played, the trigger 99 is again released and another cycle in the operation of the machine is begun to effect transferral of another record to the turntable and to effect removal of the previously played record therefrom provided the control knob 141 is again in its automatic position.

If desired the control knob 141 may be moved from its automatic position to either its repeat position or its manual position during the record playing period, but such adjustment will not effect the operation of the machine until the record being played, at the time such adjustment is made, has been completed. Assuming that the control knob has been moved from its automatic position to its repeat position in which case the clutch members 67 are disengaged from the clutch members 66, thus rendering the conveyor belts 31 inoperative, and in which case the reciprocating bar 34 is rendered inoperative by reason of the fact that the tongue 40 is moved out of the notch 39 in the slide bar 38 the operation of the machine is substantially as above described except no transferral of records either to or from the turntable is effected. The tone arm 21 is automatically returned to its starting position so long as the record remains upon the turntable and such turntable is permitted to rotate and the turntable 17 is periodically raised and lowered, but the platform 30 is locked in its uppermost position, shown in Figure 2, by reason of the fact that the arm 232 carried by the control bar 42 is positioned intermediate the brackets 233 and 234 carried, respectively, by the platform 30 and the sleeve 101 which houses the vertically movable post 100 to which the platform 30 is connected.

When the control knob 141 is in manual position the U-shaped lever 62 is supported by the supporting arm 178, thereby preventing engagement of the clutch element 56 with the clutch element 55, with the result that the cam shaft 36 is prevented from rotating and the automatic return of the tone arm 21 to starting position is made impossible. Inasmuch as the cam shaft 36 is thus prevented from rotating, there can be no operation of the ejector slide 27 and conveyor belts 31 as the operation of the ejector slide 27 and conveyor belts 31 is dependent upon rotation of the cam shaft 36. The added precaution against operation of the ejector slide 27 and conveyor belts 31, when the control knob 141 is in manual position, resides in the fact that the reciprocating bar 34 is disconnected from the slide bar 38 and the clutch member 67 is maintained out of engagement with the clutch member 66. Rotation of the cam shaft 36 is prevented, when the control knob 141 is in manual position, by reason of the fact that under such conditions the clutch element 56 cannot move into engagement with the clutch element 55 since the bell crank arm 178 is maintained in a supporting position with respect to the U-shaped arm 62 to prevent its dropping even though the trigger 99 is released from its engagement therewith by the action of the tone arm 21 upon the completion of the record playing period. Inasmuch as the cam shaft 36 is prevented from rotating during such time as the control mechanism C is maintained in manual position, there can be no lowering and raising of the turntable 17 and platform 30. However, under such conditions the platform is further insured against dropping by reason of the fact that the arm 232 carried by the control bar 42 is located intermediate the brackets 233 and 234 carried, respectively, by the platform 30 and the sleeve 101. It is when the control knob 141 is in manual position that the brake 162 may be at any time manually applied to the turntable whereas the only time at which the brake may be applied when the control knob 141 is in automatic or repeat position is before or after the machine has completed its cycle of automatic operation, the application of the brake during such cycle of operation being prevented by reason of the fact that the safety support 173 would engage the free end of the U-shaped lever 62 were an attempt made to move the brake lever 165 toward brake applying position, since it is during the cycle of automatic operation that the U-shaped lever 62 is in lowered or interfering position with respect to the safety support 173.

When the control knob 141 is in manual position and the bell crank arm 178 is positioned as shown in Figure 11, the brake 162 is automatically applied to stop the turntable after each playing period has been completed, the application of the brake under such conditions being effected by reason of the fact that when the trip lever 97 is moved by the tone arm 21, as previously described, the lever 187 acting upon the safety support 173 moves such support a sufficient distance to release the brake 162, whereupon it is urged into engagement with the turntable by the spring 167, movement of the trip lever 97 being translated to the lever 186 through the pivotally and slidably mounted finger 183, depending foot 185, lever 186, and shaft 187.

The above described operation applies to Figures 1 to 12 of the drawings, Figures 13 and 14 being directed to means for automatically stopping the machine after the last record from the magazine has been played, which means as above stated may be readily incorporated into the machine shown in Figures 1 to 12 inclusive. Inasmuch as the operation of the mechanism shown in Figures 13 and 14 is hereinbefore separately described, in connection with the mechanical features entered into such structure, no further description of the operation is deemed necessary.

What is claimed is:

1. In a phonograph, a turntable, means for rotating said turntable, a magazine adapted to hold in a stacked relation a plurality of records to be played, conveyor belts, means for ejecting the records successively from said magazine, means for placing such ejected records on said conveyor belts, means for moving said conveyor belts whereby the records are successively transferred to a position over said turntable, means for effecting relative movement between said turntable and said conveyor belts whereby the records to be played are successively lifted from said conveyor belts into playing position and after playing are placed upon said conveyor belts to be thereafter moved out of the way of the next record to be played.

2. In a phonograph, a turntable, means for rotating said turntable, a magazine adapted to hold in a stacked relation a plurality of records to be played, conveyor belts, means for ejecting the records successively from said magazine, means for placing such ejected records on said conveyor belts, means for moving said conveyor belts whereby the records are successively transferred to a position over said turntable, means for effecting relative movement between said turntable and said conveyor belts whereby the records to be played are successively lifted from said conveyor belts into playing position and after playing are placed upon said conveyor belts to be thereafter moved out of the way of the next record to be played, and restraining means adapted to be moved into the path of the record to be played as it approaches a position over said turntable for holding the record in position to be received by said turntable, said restraining means being adapted to thereafter move out of the restraining position to permit the played record to be transferred out of the path of the next record to be played.

3. In a phonograph, a turntable, means for rotating said turntable, a magazine adapted for the reception of a plurality of records to be played, a conveyor adapted to transfer records to said turntable, a platform at the bottom of said magazine, means for successively placing records on said platform in a position to be lowered as said platform is lowered, means for lowering said platform whereby the record carried thereby is placed upon said conveyor to be moved to a position directly above said turntable, and means for raising said turntable to remove the record from said conveyor and move the same into playing position.

4. In a phonograph, a reproducing device, a turntable, means for rotating said turntable, a magazine adapted for the reception of a plurality of records to be played, a conveyor adapted to transfer records to said turntable, a platform at the bottom of said magazine, means for successively placing records on said platform in a position to be lowered as said platform is lowered, means for lowering said platform whereby the record carried thereby is placed upon said conveyor to be transferred to a position directly above said turntable, means for raising said turntable to remove the record from said conveyor and move the same into playing position, and means for returning said reproducing device to starting position after the playing of each record.

5. In a phonograph, a reproducing device, a turntable, means for rotating said turntable, a magazine adapted for the reception of a plurality of records to be played, a conveyor adapted to transfer records to said turntable, a platform at the bottom of said magazine, means for successively placing records on said platform in a position to be lowered as said platform is lowered, means for lowering said platform whereby the record carried thereby is placed upon said conveyor to be moved to a position directly above said turntable, means for raising said turntable to remove the record from said conveyor and move the same into playing position, and means for returning the reproducing device to starting position after the playing of each record and for operating said conveyor, the last named means being adapted for cyclic operation and controlled by said reproducing device.

6. In a phonograph, a reproducing device, a turntable, means for rotating said turntable, storing means adapted for the reception of a plurality of records to be played, record transferring means for moving records successively from said storing means to said turntable, means for lowering said turntable after the playing of each record whereby the played record is placed upon said transferring means to be thereafter moved out of the path of the next record to be played, and means for moving said reproducing device towards the center of the record upon the lowering of said turntable and for thereafter returning said reproducing device to its starting position.

7. In a phonograph, a reproducing device, a turntable, means for rotating said turntable, a magazine adapted to hold in a stacked relation a plurality of records, a platform at the lower end of said magazine, means for transferring a record from said magazine to said platform, record transferring means for transferring records from said platform to said turntable and for removing the played records from said turntable, means for simultaneously lowering said turntable and said platform whereby the played record is transferred to the second named record transferring means and whereby the next record to be played is transferred from said platform to the second named record transferring means.

8. In a phonograph, a reproducing device, a turntable, means for rotating said turntable, a magazine adapted to hold in a stacked relation a plurality of records, a platform at the lower end of said magazine, means for transferring a record from said magazine to said platform, record transferring means for transferring records from said platform to said turntable and for removing the played records from said turntable, means for simultaneously lowering said turntable and said platform whereby the played record is transferred to the second named record transferring means and whereby the next record to be played is transferred from said platform to the second named record transferring means, and means for simultaneously raising said turntable and said platform whereby said next record to be played is lifted by said turntable into playing position and said platform is moved into position to receive the next record to be transferred to said turntable.

9. In a phonograph, a reproducing device, a turntable, means for rotating said turntable, a magazine adapted to hold in a stacked relation a plurality of records, a platform at the lower end of said magazine, means for transferring a record from said magazine to said platform, record transferring means for transferring records from said platform to said turntable and for removing the played records from said turntable, means for simultaneously lowering said turntable and said platform whereby the played record is transferred to the second named record transferring means and whereby the next record to be played is transferred from said platform to the second-named record transferring means, means for simultaneously raising said turntable and said platform whereby said next record to be played is lifted by said turntable into playing position and said platform is moved into position to receive the next record to be transferred to said turntable, and means controlled by said reproducing device for starting the operation of the first and second named record transferring means and said table raising and lowering means.

10. In a phonograph, a reproducing device, a turntable, means for rotating said turntable, a magazine adapted to hold in a stacked relation a plurality of records, a platform at the lower end of said magazine, means for transferring a record from said magazine to said platform, record transferring means for transferring records from said platform to said turntable and for removing the played records from said turntable, means for simultaneously lowering said turntable and said platform whereby the played record is transferred to the second named record transferring means and whereby the next record to be played is transferred from said platform to the second named record transferring means, means for simultaneously raising said turntable and said platform whereby said next record to be played is lifted by said turntable into playing position and said platform is moved into position to receive the next record to be transferred to said turntable, means controlled by said reproducing device for starting the operation of the first and second named record transferring means and said table raising and lowering means, and means for returning said reproducing device to starting position after the playing of each record.

11. In a phonograph, a reproducing device, a turntable, operating means adapted for cyclic operation for lowering and raising said turntable, means controlled by said reproducing device for setting said operating means in operation, and means for first moving said reproducing device toward the center of the turntable after the turntable has started on its downward movement and for returning said reproducing device to its starting position before the turntable rises to its playing position.

12. In a phonograph, a turntable, means for rotating said turntable, a magazine adapted to hold in a stacked relation a plurality of records to be played, record transferring means, means for delivering the lowermost of said records from said magazine to said transferring means, means for operating said record transferring means to successively transfer records to a position directly above said turntable, and means for lifting said turntable into engagement with the record to be played and for further moving said turntable upwardly whereby the record to be played is moved into playing position.

13. In a phonograph, a turntable, means for rotating said turntable, a magazine adapted to hold in a stacked relation a plurality of records to be played, conveyor belts, means for successively placing the lowermost of said records on said conveyor belts, means for lowering said turntable, means for operating said conveyor belts whereby the records to be played are free to move to a position over said turntable, and means for raising said turntable after the record to be played has reached a position over said turntable whereby such record is lifted from said conveyor belts to playing position.

14. In a phonograph, a turntable, means for rotating said turntable, a magazine adapted to hold a plurality of records to be played, conveyor belts, means for transferring the lowermost record of said records from said magazine to said conveyor belts, means for operating said conveyor belts whereby the records to be played are successively transferred to said turntable, and means for lowering said turntable upon the completion of the playing period whereby the played record is transferred to said conveyor belts to be moved out of the path of the next record to be played.

15. In a phonograph, a reproducing device, a turntable, means for rotating said turntable, a magazine adapted to hold in a stacked relation a plurality of records to be played, a platform located below the stack of records, an ejector, means for actuating said ejector to move the lowermost of said records onto said platform, a pair of conveyor belts for transferring records to and from said turntable, means for lowering said turntable and said platform whereby the played record is removed from said table and placed upon said conveyor belts and whereby the record carried by said platform is placed upon said conveyor belts, means for returning said reproducing device to starting position after the playing of each record, and manually controlled means for rendering said ejector and conveyor belts inoperative and for locking said platform in its elevated position without affecting the rotation of said turntable and the return movement of said reproducing device to starting position.

16. In a phonograph, a reproducing device, a turntable, means for rotating said turntable, a magazine adapted to hold in a stacked relation a plurality of records to be played, a platform located below the stack of records, an ejector, means for actuating said ejector to move the lowermost of the said records on to said support, a pair of conveyor belts for transferring records to and from said turntable, means for lowering said turntable and said platform whereby the played record is removed from said turntable and placed upon said conveyor belts and whereby the record carried by said platform is placed upon said conveyor belts, means for returning said reproducing device to starting position after the playing of each record, and manually controlled means for rendering said ejector and conveyor belts inoperative and for locking said platform in its elevated position and for rendering the reproducing device returning means inoperative without affecting the rotation of said turntable.

17. In a phonograph, a reproducing device, a turnable, operating means adapted for cyclic operation for lowering and raising said turntable, means controlled by said reproducing device for setting said operating means in operation, means for first moving said reproducing device toward the center of the turntable after the turntable has started on its downward movement and for returning said reproducing device to its starting position before the turntable rises to its playing position, a magazine adapted for the reception of a plurality of records to be played, record transferring means adapted to cooperate with said operating means to transfer records from said magazine to said turntable and remove the played records from said turntable, and manually controlled means for rendering said record transferring means operative and inoperative at will.

18. In a phonograph, a turntable, means for rotating said turntable, a magazine adapted to hold in a stacked relation a plurality of records to be played, record transferring means, means for delivering the lowermost of said records from said magazine to said transferring means, means for operating said record transferring means to successively transfer records to the turntable, and means automatically rendered operative in the absence of a record to be transferred to the turntable to render said turntable, operating means and record transferring means inoperative upon completion of the playing of the last record transferred to the turntable from said magazine.

19. In a phonograph, a reproducing device, a turntable, a spring motor for rotating said turntable, operating means connected with said spring motor adapted for cyclic operation for lowering and raising said turntable, means actuated by said reproducing device upon the completion of the playing of a record for setting said operating means in operation, means for returning said reproducing device to starting position during the lowering and raising of said turntable, and means set into operation during the cycle of operation of said operating means for rewinding said spring motor.

20. In a phonograph, a reproducing device, a turn table, means for rotating said turn table, a magazine adapted to hold in a stacked relation a plurality of records to be played, a bottom for said magazine including a pair of relatively movable members cooperating with each other to normally support said records in said magazine, one of said members being adapted to receive from the other of said members the lowermost record of the stack, record transferring means for moving records to and from said turn table, means for moving said one of said members with its record thereon into position to deposit its record on said record transferring means, means for returning said reproducing device to starting position after the playing of each record, and manually controlled means for rendering said record transferring means inoperative and for locking said one of said members in its record supporting position without affecting the rotation of said turn table and the return movement of said reproducing device to said starting position.

21. In a phonograph, a reproducing device, a turn table, means for rotating said turn table, a magazine adapted to hold in a stacked relation a plurality of records to be played, a bottom for said magazine including a pair of relatively movable members cooperating with each other to normally support said records in said magazine, one of said members being adapted to receive from the other of said members the lowermost record of the stack, record transferring means for moving records to and from said turn table, means for moving said one of said members with its record thereon into position to deposit its record on said record transferring means, means for returning said reproducing device to starting position after the playing of each record and manually controlled means for rendering said record transferring means inoperative and for locking said one of said members in its record supporting position and for rendering the reproducing device returning means inoperative without affecting the rotation of said turn table.

22. In a phonograph, a turn table, means for rotating said turn table, a magazine adapted to hold a plurality of records to be played, a conveyor adapted to receive records successively from said magazine and transfer them to a position over said turn table, record-restraining means adapted to restrain the movement of the records being transferred, and actuating means for moving said record restraining means into the path of the records to be played as they approach a position over said turn table.

23. In a phonograph, a turn table, means for rotating said turn table, a magazine adapted to hold a plurality of records to be played, a conveyor adapted to receive records successively from said magazine and transfer them to a position over said turn table, record-restraining means adapted to restrain the movement of the records being transferred, actuating means for moving said record-restraining means into the path of the records to be played as they approach a position over said turn table, means for intermittently effecting relative movement between said turn table and said conveyor whereby the records to be played are lifted from said conveyor by said turn table and whereby the played records are lifted from said turn table by said conveyor.

24. In a phonograph, a reproducing device, a turn table, means for rotating said turn table, a magazine adapted to hold a plurality of records to be played, record transferring means for moving said records successively from said magazine to said turn table, operating means adapted for cyclic operation for effecting relative movement between said turn table and said record transferring means, means controlled by said reproducing device for setting said operating means in operation, and means for first moving said reproducing device towards the center of the turn table after the playing of a record and after relative movement between said turn table and said record transferring means has started and for returning said reproducing device to its starting position before relative movement between said turn table and said record transferring means is completed.

25. In a phonograph, a tone arm including a reproducing device, a turn table, means for rotating said turn table, a magazine adapted to hold a plurality of records to be played, record transferring means for moving said records successively from said magazine to said turn table, operating means adapted for cyclic operation for effecting relative movement between said turn table and said record transferring means, means controlled by said tone arm for setting said operating means in operation, and means for first moving said tone arm and reproducing device towards the center of the turn table while maintaining said reproducing device in its playing plane after relative movement between said turn table and said record transferring means has started and for returning said tone arm and said reproducing device to starting position while maintaining said reproducing device in its playing plane.

26. In a phonograph, a tone arm including a reproducing device, a turn table, means for rotating said turn table, a magazine adapted to hold a plurality of records to be played, record transferring means for moving said records successively from said magazine to said turn table, operating means adapted for cyclic operation for effecting relative movement between said turn table and said record transferring means, means controlled by said tone arm for setting said operating means in operation, and means for first moving said reproducing device towards the center of the turn table after the playing of a record and after relative movement between said turn table and said record transferring means has started and for returning said reproducing device to its starting position within the outer edge of the record to be played before relative movement between said turn table and said record transferring means is completed.

27. In a phonograph, a reproducing device, a turn table, means for rotating said turn table, storing means adapted for the reception of a plurality of records to be played, periodically operated record transferring means for moving records successively from said storing means to said turn table and for removing the played records from said turn table, periodically operated means for returning the reproducing device to starting position after the playing of each record, manual control means for rendering said record transferring means and said reproducing device returning means inoperative upon completion of their respective cycles of operation without affecting the rotation of said turn table, and means for rendering said control means inoperative until such time as the cycle of operation of said record transferring means and said reproducing device returning means have been completed.

28. In a phonograph, a reproducing device, a turn table, means for rotating said turn table, storing means adapted for the reception of a plurality of records to be played, record transferring means for moving records from said storing means to said turn table, means for effecting relative movement between said record transferring means and said turn table after the playing of each record whereby the played record is placed upon said transferring means to be thereafter moved out of the path of the next record to be played, and means for moving said reproducing device towards the center of the record after the playing thereof and while said record transferring means and said turn table are being moved relatively to each other and for returning said reproducing device to its starting position.

29. In a phonograph, a reproducing device, a turn table, means for rotating said turn table, storing means adapted for the reception of a plurality of records to be played, a platform at the lower end of said storing means, means for transferring a record from said storing means to said platform, record transferring means for transferring records from said platform to said turn table and for removing the played records from said turn table, means for moving said turn table and said platform whereby the played record is transferred to the second named record transferring means and whereby the next record to be played is transferred from said platform to the second named record transferring means.

30. In a phonograph, a reproducing device, a turn table, means for rotating said turn table, storing means adapted for the reception of a plurality of records to be played, a platform at the lower end of said storing means, means for transferring a record from said storing means to said platform, record transferring means for transferring records from said platform to said turn table and for removing the played records from said turn table, means for simultaneously moving said turn table and said platform whereby the played record is transferred to the second named record transferring means and whereby the next record to be played is transferred from said platform to the second named record transferring means.

31. In a phonograph, a reproducing device, a turn table, means for rotating said turn table, storing means adapted for the reception of a plurality of records to be played, a platform at the lower end of said storing means, means for transferring a record from said storing means to said platform, record transferring means for transferring records from said platform to said turn table and for removing the played records from said turn table, means for moving said turn table and said platform whereby the played record is transferred to the second named record transferring means and whereby the next record to be played is transferred from said platform to the second named record transferring means, and means for moving said turn table and said platform whereby said next record to be played is lifted by said turn table into playing position and said platform is caused to assume a position to receive the next record to be transferred to said turn table.

32. In a phonograph, a reproducing device, a turn table, means for rotating said turn table, storing means adapted for the reception of a plurality of records to be played, a platform at the lower end of said storing means, means for transferring a record from said storing means to said platform, record transferring means for transferring records from said platform to said turn table and for removing the played records from said turn table, means for moving said turn table and said platform whereby the played record is transferred to the second named record transferring means and whereby the next record to be played is transferred from said platform to the second named record transferring means, means for moving said turn table and said platform whereby said next record to be played is lifted by said turn table into playing position and said platform is caused to assume a position to receive the next record to be transferred to said turn table, and means controlled by said reproducing device for starting the operation of the first and second named record transferring means.

33. In a phonograph, a reproducing device, a turn table, means for rotating said turn table, storing means adapted for the reception of a plurality of records to be played, a platform at the lower end of said storing means, means for transferring a record from said storing means to said platform, record transferring means for transferring records from said platform to said turn table and for removing the played records from said turn table, means for moving said turn table and said platform whereby the played record is transferred to the second named record transferring means and whereby the next record to be played is transferred from said platform to the second named record transferring means; means for moving said turn table and said platform whereby said next record to be played is lifted by said turn table into playing position and said platform is caused to assume a position to receive the next record to be transferred to said turn table, means controlled by said reproducing device for starting the operation of the first and second named record transferring means, and means for returning said reproducing device to starting position after the playing of each record.

34. In a phonograph, a reproducing device, a turn table, means for rotating said turn table, storing means adapted to hold a plurality of records to be played, a platform located below the said records, an ejector, means for actuating said ejector to move said records from said storing means onto said platform, conveyor belts for transferring records to and from said turn table, means for effecting relative movement between said conveyor belts and said platform and said turn table whereby the played record is removed from said turn table and placed upon said conveyor belts and whereby the record carried by said platform is placed upon said conveyor belts, means for returning said reproducing device to starting position after the playing of each record, and manually controlled means for rendering said ejector and conveyor belts inoperative and for locking said platform in a given position without effecting the rotation of said turn table and the return movement of said reproducing device to starting position.

35. In a phonograph, a reproducing device, a turn table, means for rotating said turn table, storing means adapted to hold a plurality of records to be played, a platform located below the said records, an ejector, means for actuating said ejector to move said records from said storing means onto said platform, conveyor belts for transferring records to and from said turn table, means for effecting relative movement between said conveyor belts and said platform and said turn table whereby the played record is removed from said turn table and placed upon said conveyor belts and whereby the record carried by said platform is placed upon said conveyor belts, means for returning said reproducing device to starting position after the playing of each record, and manually controlled means for rendering said ejector and conveyor belts inoperative and for locking said platform in a given position and for rendering the reproducing device returning means inoperative without effecting the rotation of said turn table.

36. In a phonograph, a turn table, means for rotating said turn table, a magazine adapted for the reception of a plurality of records to be played, record transferring means for moving records successively from said magazine to a position over said turn table and for simultaneously moving the played record out of the way of the next record to be played, means for raising said turn table into engagement with the record positioned thereabove, and means for lowering said turn table after the playing of a record, whereby the played record is placed upon said record transferring means to be transferred out of the way of the next record to be transferred to said turn table.

In testimony whereof, I have affixed my signature to this specification.

GEORGE H. PITTMAN.